US011292543B2

(12) United States Patent
Vogel et al.

(10) Patent No.: US 11,292,543 B2
(45) Date of Patent: Apr. 5, 2022

(54) SYSTEMS AND METHODS FOR A MOUNTABLE MULTI-POSITIONAL DEVICE HOLDER

(71) Applicant: NITE IZE, INC., Boulder, CO (US)

(72) Inventors: Frank Vogel, Boulder, CO (US); Bowden Ormsbee, Longmont, CO (US); Steven L. Lindquist, Broomfield, CO (US)

(73) Assignee: NITE IZE, INC., Boulder, CO (US)

( * ) Notice: Subject to any disclaimer, the term of this patent is extended or adjusted under 35 U.S.C. 154(b) by 84 days.

(21) Appl. No.: 15/844,113

(22) Filed: Dec. 15, 2017

(65) Prior Publication Data

US 2019/0185094 A1 Jun. 20, 2019

(51) Int. Cl.
| | |
|---|---|
| B62J 45/10 | (2020.01) |
| F16B 2/22 | (2006.01) |
| F16B 2/08 | (2006.01) |
| F16B 1/00 | (2006.01) |
| F16B 2/00 | (2006.01) |
| B62J 9/21 | (2020.01) |
| B62J 50/21 | (2020.01) |

(52) U.S. Cl.
CPC ............. B62J 45/10 (2020.02); B62J 9/21 (2020.02); B62J 50/225 (2020.02); F16B 1/00 (2013.01); F16B 2/005 (2013.01); F16B 2/08 (2013.01); F16B 2/22 (2013.01); F16B 2001/0035 (2013.01)

(58) Field of Classification Search
CPC ........................... F16B 2001/0035; B62J 9/003
USPC ....................................................... 224/420
See application file for complete search history.

(56) References Cited

U.S. PATENT DOCUMENTS

| | | | | |
|---|---|---|---|---|
| 7,523,904 B2 * | 4/2009 | Carnevali | ............... | F16C 11/10 248/176.1 |
| 7,886,903 B1 * | 2/2011 | Wurzelbacher, Jr | ........................ | G06F 1/1616 206/320 |
| 8,020,829 B1 * | 9/2011 | Tamayori | ............... | F16M 11/14 108/144.11 |
| 8,616,508 B1 * | 12/2013 | Coleman | ................ | F16M 11/10 248/176.1 |
| 9,529,388 B1 * | 12/2016 | Mchatet | ............... | F16M 11/041 |
| 9,635,983 B2 * | 5/2017 | Berge | ...................... | A47J 47/16 |
| D795,235 S * | 8/2017 | Haymond | ................... | D14/250 |
| 10,113,688 B2 * | 10/2018 | Zhu | ......................... | F16M 13/02 |
| 10,322,764 B2 * | 6/2019 | Thomas | ...................... | B62J 9/21 |
| 2003/0042385 A1 * | 3/2003 | Hung | ................... | G06F 1/1601 248/371 |

(Continued)

FOREIGN PATENT DOCUMENTS

| | | |
|---|---|---|
| CN | 205345177 U | 6/2016 |
| CN | 205916245 U | 2/2017 |

(Continued)

OTHER PUBLICATIONS

Office Action dated May 2, 2021 issued in co-pending Chinese patent app No. 201810379586.5 (25 pages with English translation).

(Continued)

Primary Examiner — Derek J Battisti
(74) Attorney, Agent, or Firm — Haynes and Boone, LLP (57) ABSTRACT

A device holder includes a base portion, the base portion attachable to an object. The device holder further includes a ball portion mounted on the base portion. The device holder further includes a cage portion, interconnected with the base portion, the cage portion shaped to hold a mobile device.

25 Claims, 12 Drawing Sheets

(56) References Cited

U.S. PATENT DOCUMENTS

| | | | | |
|---|---|---|---|---|
| 2004/0188576 A1* | 9/2004 | Carnevali | ............. | F16M 13/00 248/206.5 |
| 2006/0000957 A1* | 1/2006 | Carnevali | ............. | F16M 11/14 248/181.1 |
| 2007/0090241 A1* | 4/2007 | Risse | ................... | G06F 1/1632 248/214 |
| 2007/0114346 A1* | 5/2007 | Omps | ................ | F16C 11/0619 248/181.1 |
| 2012/0024917 A1* | 2/2012 | Case | ........................ | A45F 3/02 224/259 |
| 2012/0175474 A1* | 7/2012 | Barnard | .............. | F16M 11/041 248/122.1 |
| 2014/0259538 A1* | 9/2014 | Bransfield | ................ | A45F 5/00 24/3.13 |
| 2015/0305518 A1* | 10/2015 | Galant | ................... | F16M 11/06 248/551 |
| 2016/0134733 A1 | 5/2016 | Murphy et al. | | |
| 2016/0183393 A1 | 6/2016 | Groom et al. | | |
| 2016/0211875 A1 | 7/2016 | Smith et al. | | |
| 2017/0035165 A1 | 2/2017 | Chiang | | |
| 2017/0284433 A1 | 10/2017 | Thomas | | |

FOREIGN PATENT DOCUMENTS

| | | |
|---|---|---|
| CN | 206254921 U | 6/2017 |
| CN | 206461676 U | 9/2017 |
| CN | 206634119 U | 11/2017 |
| TW | M525587 U | 7/2016 |
| WO | WO 2014126468 A1 | 8/2014 |

OTHER PUBLICATIONS

Office Action issued in related Chinese patent app. No. 201810379586.5 dated Dec. 16, 2021 (28 pages).

* cited by examiner

FIG. 21

SYSTEMS AND METHODS FOR A MOUNTABLE MULTI-POSITIONAL DEVICE HOLDER

BACKGROUND

Phone mounts are very popular products in the marketplace. Users desire to view and interact with their phones on a hands-free basis. To support this, multiple phone mounts and holders have been developed. A very useful feature for phone holders is providing a holder that may be oriented in a variety of positions, for easy access and viewing by the user. At the same time, it is desirable to deploy the holder and the device in situations where movement may occur that might dislodge the device, such as on a bicycle or other moving vehicle. Therefore, it is desirable to have a holder that safely holds a device in a variety of viewing positions.

BRIEF SUMMARY

In one embodiment, a device holder includes a base portion, the base portion attachable to an object. The device holder further includes a ball portion mounted on the base portion. The device holder further includes a cage portion, interconnected with the base portion, the cage portion shaped to hold a mobile device. In one alternative, the cage portion is made of elastic material such that it stretches around the mobile device holding it firmly. In another alternative, the device holder further includes a cage holder, the cage holder having a locking tab, the locking tab interacting with the base portion to hold the cage portion to the base portion. Alternatively, the locking tab has a first position and a second position, the first position characterized by the locking tab being proximate to the base portion such that the cage portion is held to the base portion, the second position characterized by the locking tab being distal from the base portion, such that the cage portion can be removed. In another alternative, the device holder further includes a socket, the socket including a magnet, wherein the ball portion is made of magnetic material, and the magnet of the socket and the magnetic material of the ball portion cooperate to hold the socket in a position, and wherein the socket is interconnected with the mobile device. Optionally, the base portion includes a support, the support having a connection area. Alternatively, the base portion includes a strap. In one alternative, the strap includes a plurality of apertures and the base portion includes a prong. Optionally, the support and connection area are configured to accommodate an object placed in the connection area and the strap is positioned in relation to the object and the connection area such that the strap wraps around the object and is held in place by the prong passing through one of the plurality of apertures. Alternatively, the connection area has a concave shape and the object is a handle bar of a bike. In another alternative, the cage portion is shaped to surround a rectangular prism and includes a first, second, third, and fourth aperture, each of the first, second, third, and fourth apertures positioned to be diagonal to the sides of the rectangular prism, such that the first, second, third, and fourth aperture each allow a corner of the rectangular prism to pass through and thereby hold the rectangular prism.

In one embodiment, a device holder includes a base portion, the base portion attachable to an object. The device holder further includes a device plate and a cage portion, interconnected with the base portion, the cage portion shaped to hold a mobile device. Alternatively, the device plate is rotatable in relation to the base portion. In one alternative, the cage portion is made of elastic material such that it stretches around the mobile device holding it firmly. In another alternative, the base portion includes a support, the support having a connection area. Alternatively, the base portion includes a strap. Optionally, the strap includes a plurality of apertures and the base portion includes a prong. In another alternative, the support and connection area are configured to accommodate an object placed in the connection area and the strap is positioned in relation to the object and the connection area such that the strap wraps around the object and is held in place by the prong passing through one of the plurality of apertures. Optionally, the connection area has a concave shape and the object is a handle bar of a bike. Alternatively, the cage portion is shaped to surround a rectangular prism and includes a first, second, third, and fourth aperture, each of the first, second, third, and fourth apertures positioned to be diagonal to the sides of the rectangular prism, such that the first, second, third, and fourth aperture each allow a corner of the rectangular prism to pass through and thereby hold the rectangular prism.

In one embodiment, a method of securing a device to a bicycle handle bar includes providing a socket and attaching the socket to the device. The method further includes providing a device holder, the device holder having a base portion, a ball portion mounted on the base portion, and a cage portion, interconnected with the base portion, the cage portion shaped to hold the device. The method further includes stretching the cage portion around the device, such that the device is held by the cage portion. The method further includes connecting, using magnetism, the socket portion to the ball portion. The method further includes connecting the base portion to the bicycle handle bars, by placing a connection area on the handle bars, stretching a strap around the handle bars, and locking the strap to the base portion using a prong of the base portion.

DETAILED DESCRIPTION

Certain terminology is used herein for convenience only and is not to be taken as a limitation on the embodiments of the systems and methods for a mountable multi-positional device holder. In many embodiments, the device holder includes a rounded portion for receiving a magnetic attachment device. The device holder further includes a cage for attaching to the mobile device held. The cage portion is attached to the device holder as well, which prevents the mobile device from releasing. Mobile devices include, but are not limited to, devices having a generally square or rectangular shape such as smart phones and tablets. The system may be shaped to accommodate a variety of devices.

Figure 1:
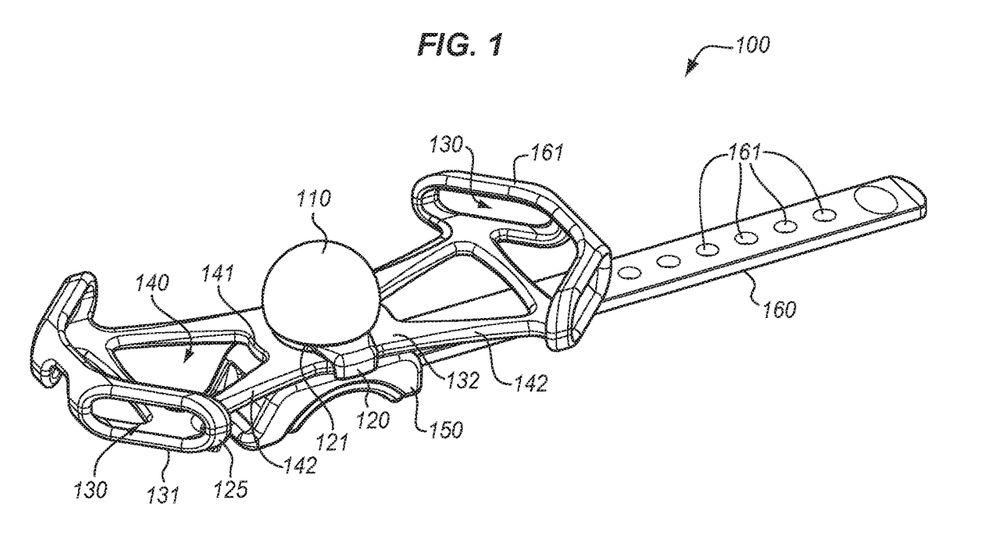
FIG. 1 shows one embodiment of a mountable multi-positional device holder.

FIG. 1 shows one embodiment of a device holder. Device holder 100 accommodates holding a smart phone or other device safely in a variety of view angles. Device holder 100 includes a ball portion 110. Ball portion 110 is made of magnetic material. Ball portion 110 may itself be magnetic, either by its composition or may contain a magnet. Additionally and in relation to this embodiment, ball portion 110 is composed of a material that may be magnetically acted upon, in this case metal. Although ball portion 110 is shown as a ball, any rounded surface may provide for the mounting of the disc shown in FIG. 19 in a variety of configurations. Ball portion 110 sits on base portion 150. Base portion 150 allows for attachment to a variety of items and surfaces. Also visible is cage portion 132. Cage portion 132 is made of material that has such a durometer and elasticity such that it may stretch and bend to be placed around a mobile device and held firmly. The corners of the mobile device are placed through apertures 130 such that they are surrounded by band portions 131. Band portions 131 may stretch somewhat to tightly hold the device. Additionally, arms 142 and cutout 140 may accommodate the holding of the device by stretching as well. The dimensions and features of the cage portion 132 are purely exemplary and will vary based on the type of device the device holder 100 is used with. Additionally, the point of the cage 132 is to provide a holder that can stretch and move with the device, while holding the device to the device holder 100.

Also visible in FIG. 1 is cage holder 121. As visible in FIG. 1, cage holder 121 includes a tab portion 120. This tab portion 120 may be rotated such that it fits over cage 132 at interconnection portion 141. When the tab is in this position the cage is held, such that it may not be easily removed from base portion 150. When the tab 120 on the cage holder 121 is engaged as shown, cage portion 132 may be removed from the device holder 100. This allows for the device to be used with and without the cage 132 and may allow for easier insertion of the mobile device in cage 132. The dimensions and exact design of cage holder 121 may be modified in alternatives. The point of cage holder 120 is to provide for a releasable mechanism to hold the cage 132 to the device holder 100.

Figure 2:
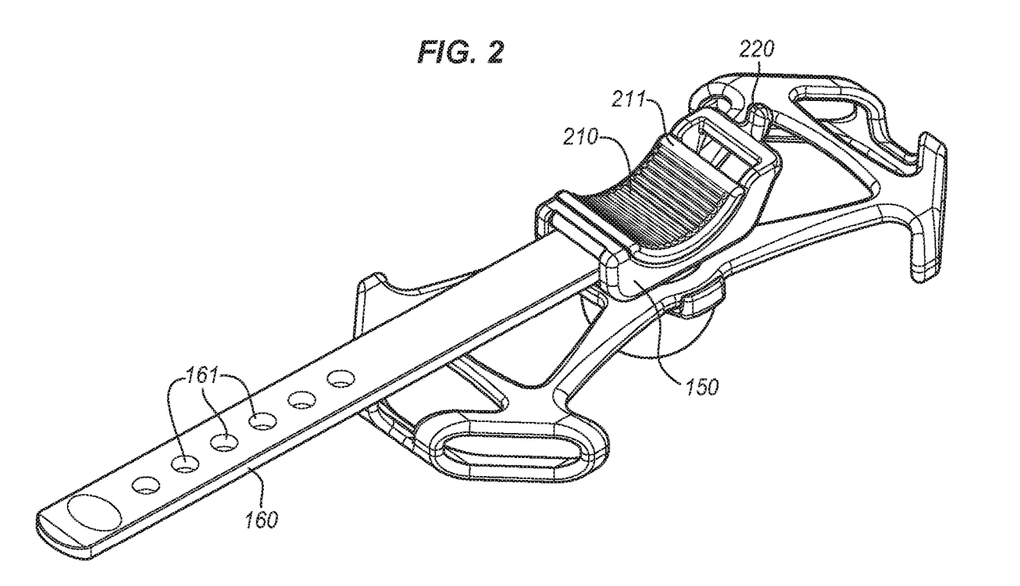
FIG. 2 shows a view of the underside of the mountable multi-positional device holder of FIG. 1.
Figure 3:
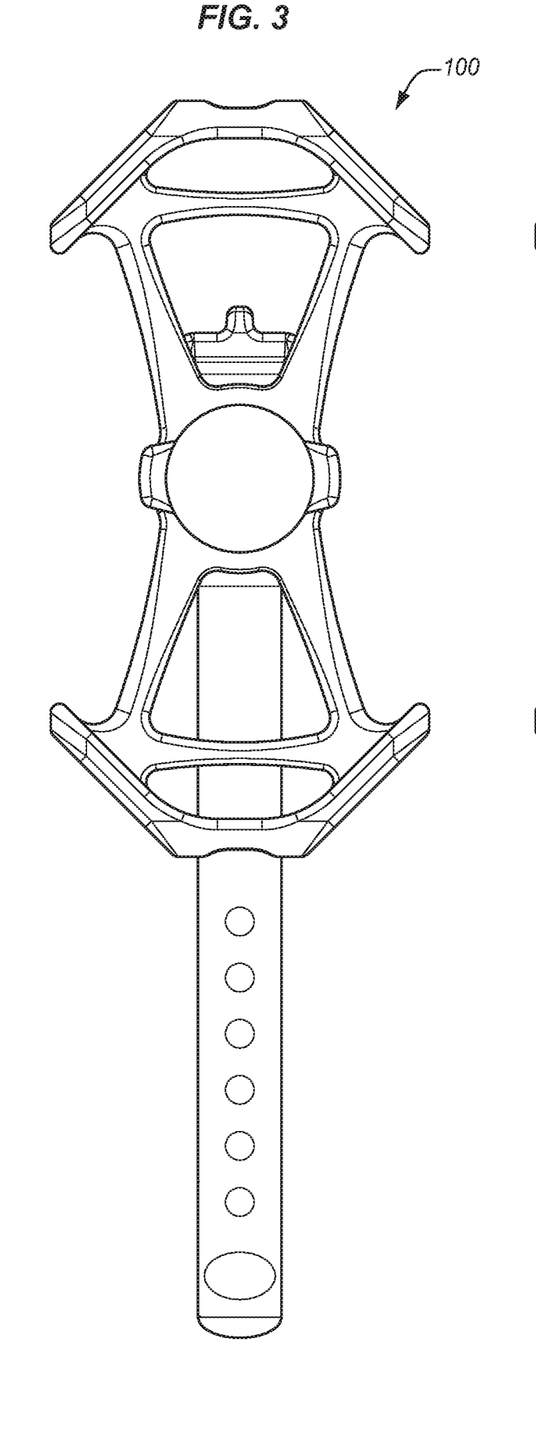
FIG. 3 shows a top view of the mountable multi-positional device holder of FIG. 1.
Figure 4:
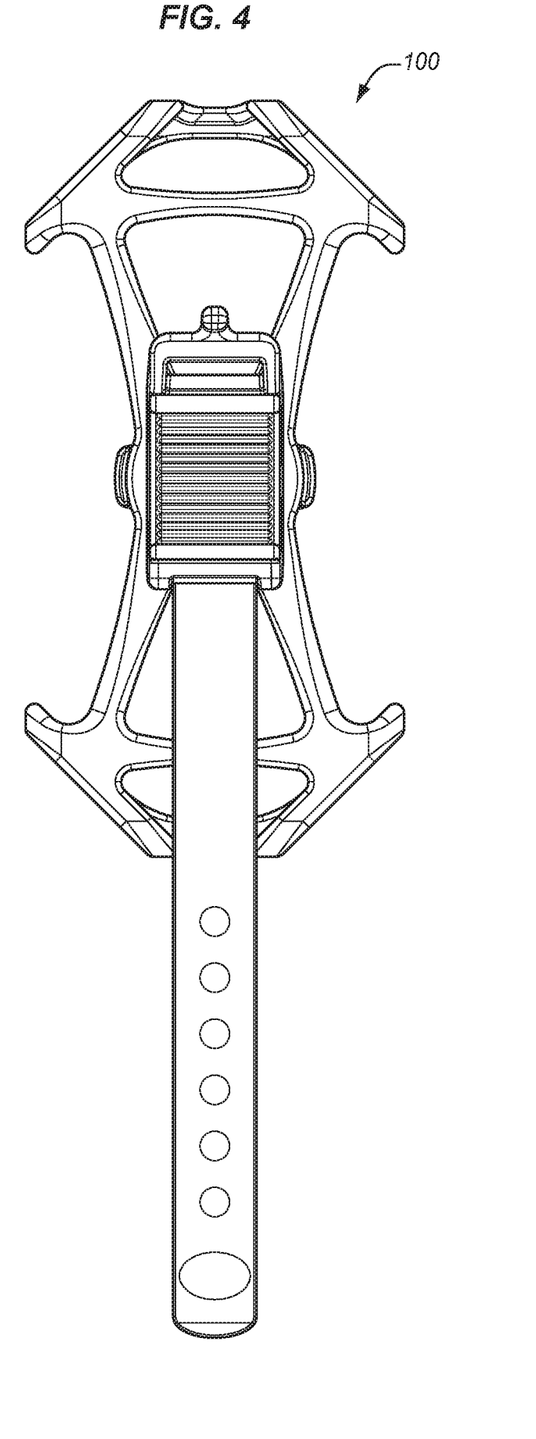
FIG. 4 shows a bottom view of the mountable multi-positional device holder of FIG. 1.
Figure 5:
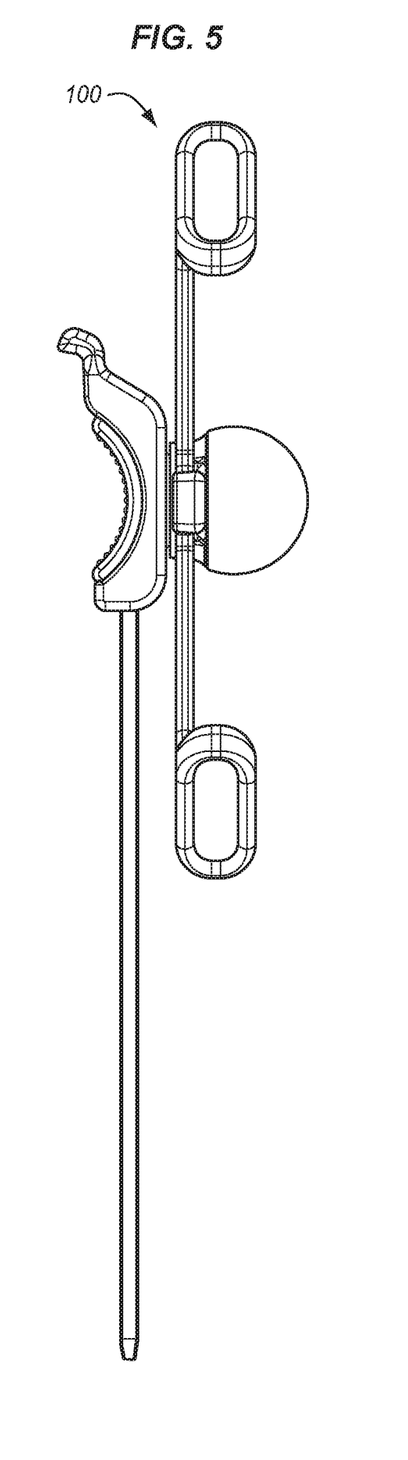
FIG. 5 shows a left side view of the mountable multi-positional device holder of FIG. 1.
Figure 6:
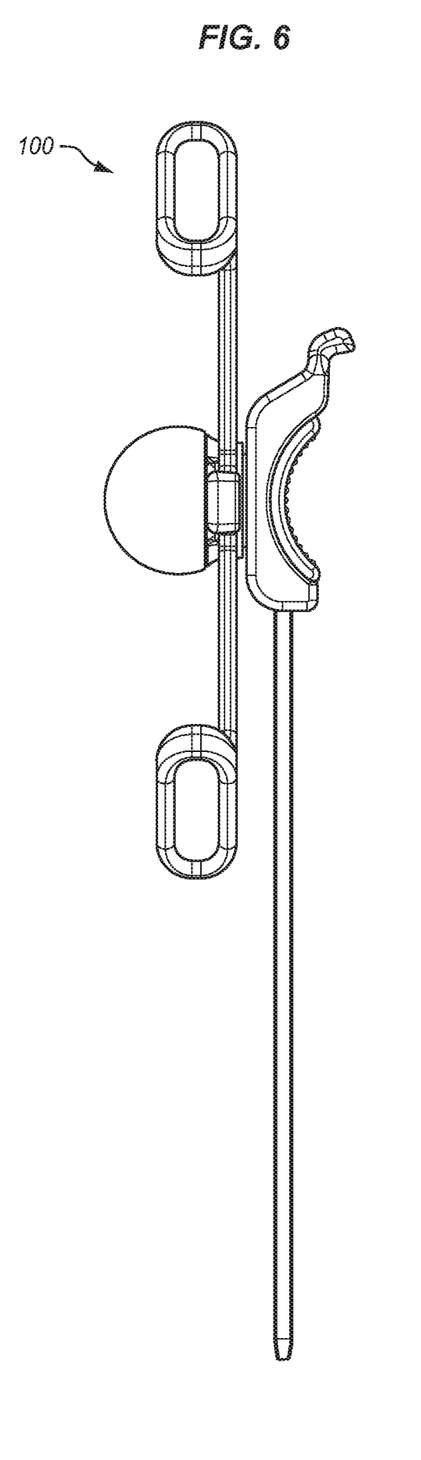
FIG. 6 shows a right side view of the mountable multi-positional device holder of FIG. 1.
Figure 7:
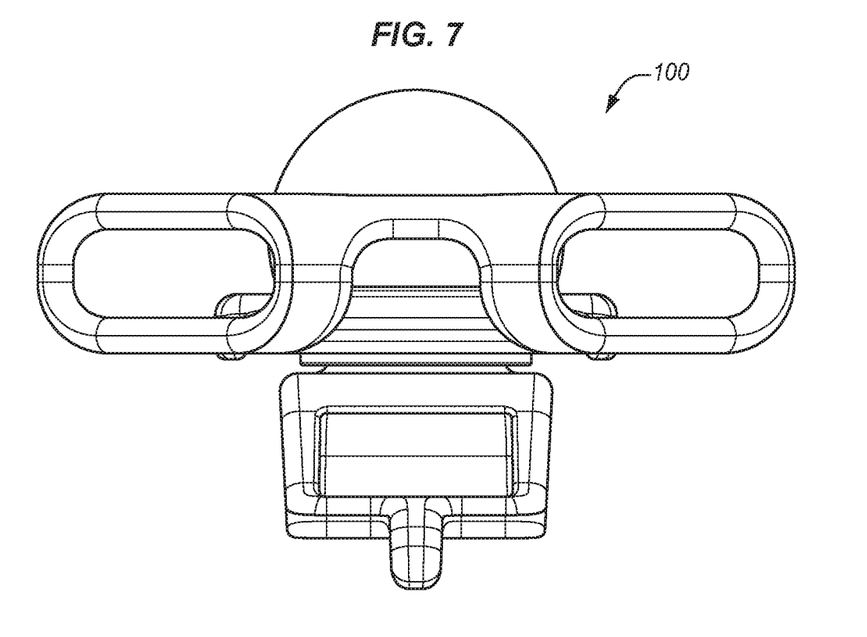
FIG. 7 shows a front view of the mountable multi-positional device holder of FIG. 1.
Figure 8:
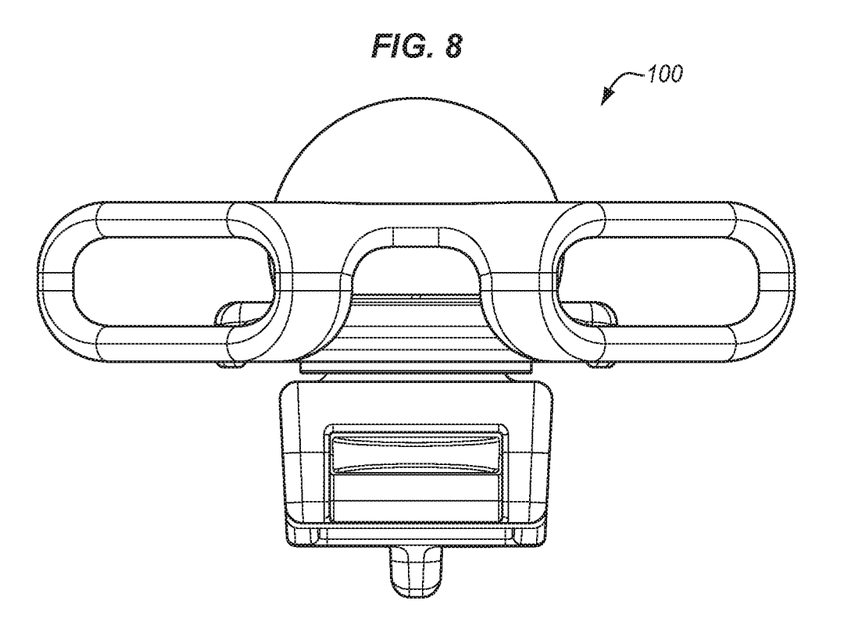
FIG. 8 shows a back view of the mountable multi-positional device holder of FIG. 1.

Also visible in FIG. 1 is strap 160. Strap 160 is made of an elastic type material that may be stretched. Strap 160 includes various apertures 161 for the connection and tensioning of the device holder 100. FIG. 2 shows a view of the underside of the device holder 100. Visible are base 150 and connection area 210 and support 211. Prong 220 is designed to interface with apertures 161. Connection area 210 may include high friction material or features that increase the friction in connection area 210. In operation, the device holder 100 may be placed on the handle bars of a bike or other item, contacting at connection area 210. Then the strap 160 may be wrapped around the handle bars and stretched tight to hold the device holder 100 in place. The strap 160 is held by interfacing aperture 161 with prong 220, such that the strap is under tension. Note that is merely one preferred embodiment of an interconnection device. A variety of other clamps or holders may be used in conjunction with the ball portion 110 and the cage portion 132 of the device holder 100.

Figure 9:
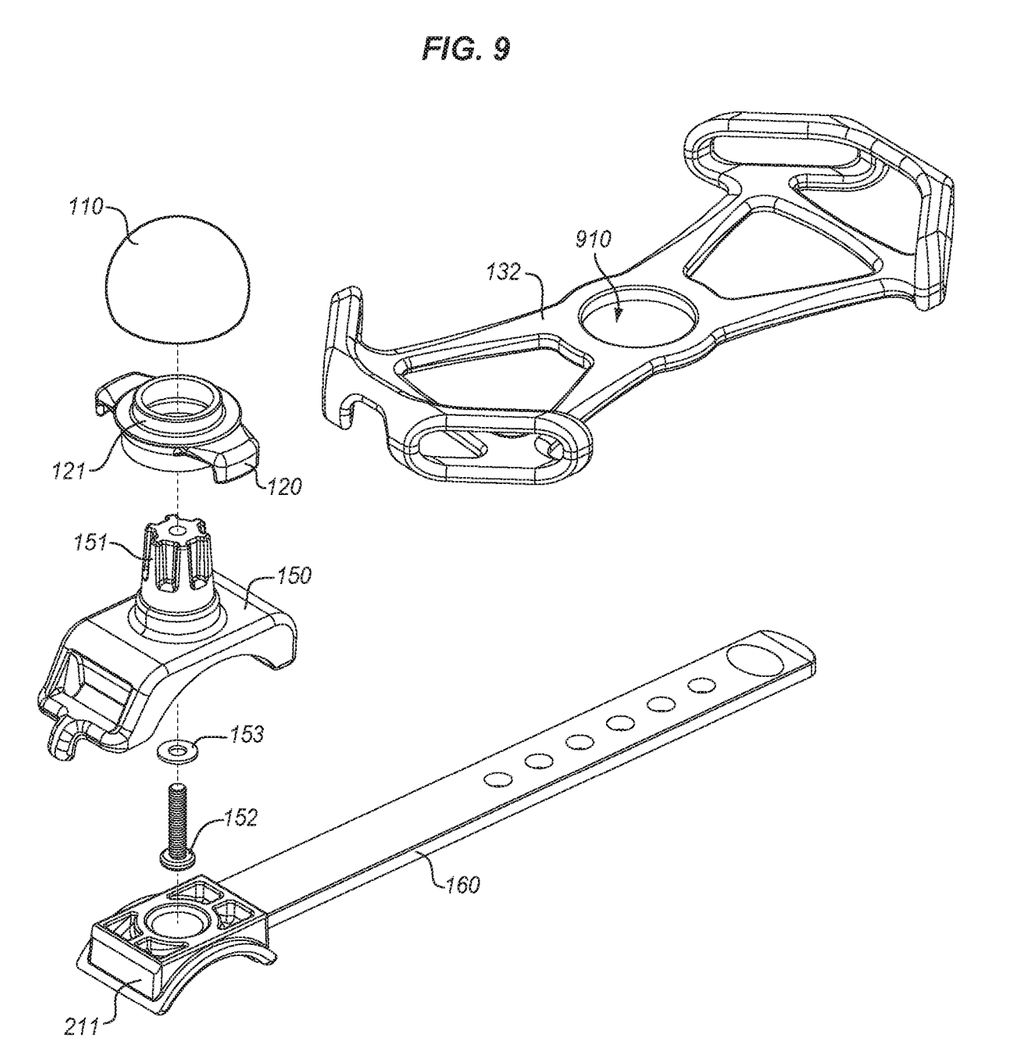
FIG. 9 shows an exploded view of the mountable multi-positional device holder of FIG. 1

FIG. 9 shows an exploded view of the device holder 100. As seen in this figure, cage 132 includes an aperture 910 that stretches to accommodate fitting around the ball portion 110. As can be more clearly seen in the exploded view, the tabs 120 are designed to fit snugly over base portion 150, when turned. In this way the cage 132 may be held tightly to the base portion 150. The top 151 of base portion 150 includes a gearing or other bracing type design that interfaces with the inside of ball portion 110, preventing it from rotating. At the same time, cage holder 121 may rotate, such that it holds the cage 132 in place. The device holder 100 may be held together by a variety of means, in this case washer 153 and screw 152.

Figure 19:
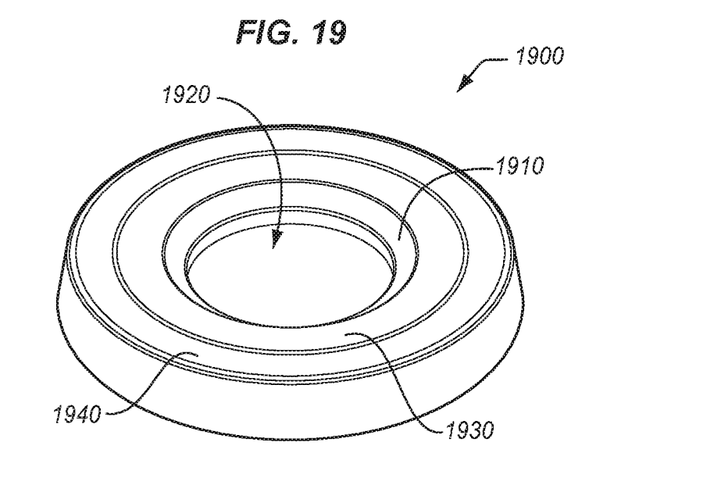
FIG. 19 shows one embodiment of a socket designed to interface with the ball portion of the mountable multi-positional device holder of FIG. 1.
Figure 20:
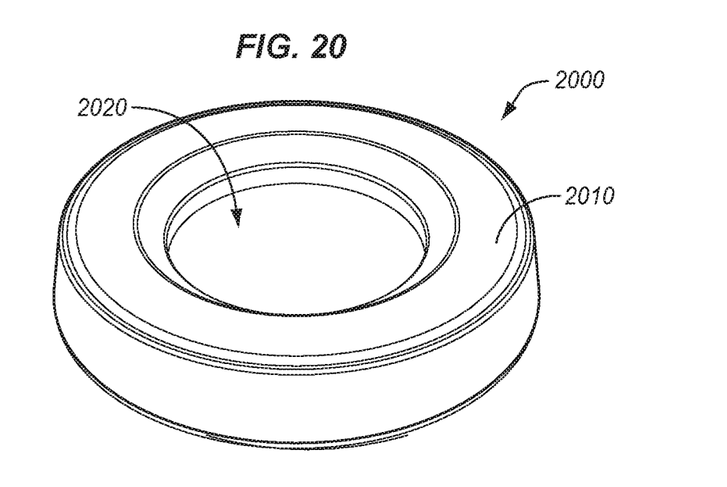
FIG. 20 shows an alternative embodiment of a socket designed to interface with the ball portion of the mountable multi-positional device holder of FIG. 1.
Figure 21:
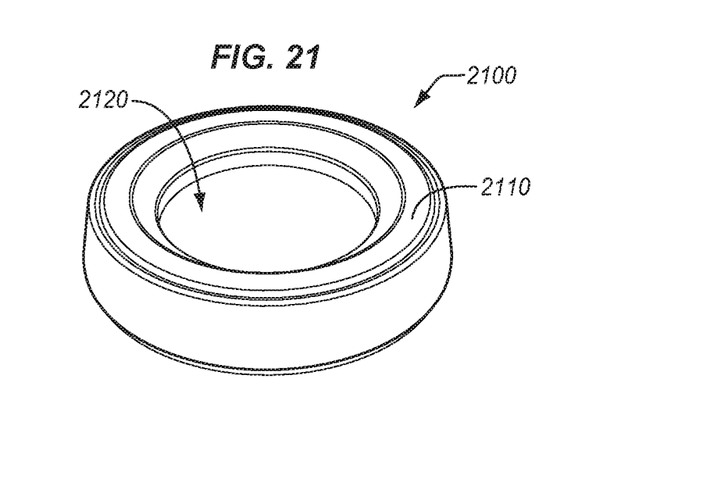
FIG. 21 shows an alternative embodiment of a socket designed to interface with the ball portion of the mountable multi-positional device holder of FIG. 1.

FIG. 19 shows one embodiment of a socket designed to interface with the ball portion 110 of device holder 100. The socket 1900 is sized such that it has a shape complementary to the ball portion 110, in that it surround less than the entire circumference of the ball portion. As shown, socket 1900 includes a magnetic portion 1930 having a shaped section 1910 that is concave to more completely interface with the ball portion 110. Additionally, an outer elastomeric material 1940 and an inner elastomeric material 1920 are included. The inner elastomeric material 1920 increases the friction of the device on the ball portion 110. These elastomeric materials may alternatively be material that creates friction. The back side of the socket 1900 may include an adhesive material to attach to an electronic device. Alternatively, the backside may include other attachment mechanisms, such as clamps, Velcro, etc. Alternatively, the mobile device may include a magnetic plate that magnetically attaches to the socket 1900. FIG. 20 shows an alternative version of a socket, socket 2000. This socket 2000 has a more powerful magnet 2010 and also includes a high friction material 2020. In this version there is no outer high friction/elastomeric material. FIG. 21 shows another alternative socket, which is a small socket 2100. This socket also has no outer elastomeric material. Small socket 2100 includes magnet 2110 and elastomeric/high friction material 2120.

One advantage of the holder device 100 is that the cage portion 132 has enough elasticity to allow the mobile device mounted on the socket 1900 to be oriented in a variety of configurations. Therefore, the user may tilt, rotate, or otherwise orient the device with little fear that the device will fall off of the holder device 100.

Figure 10:
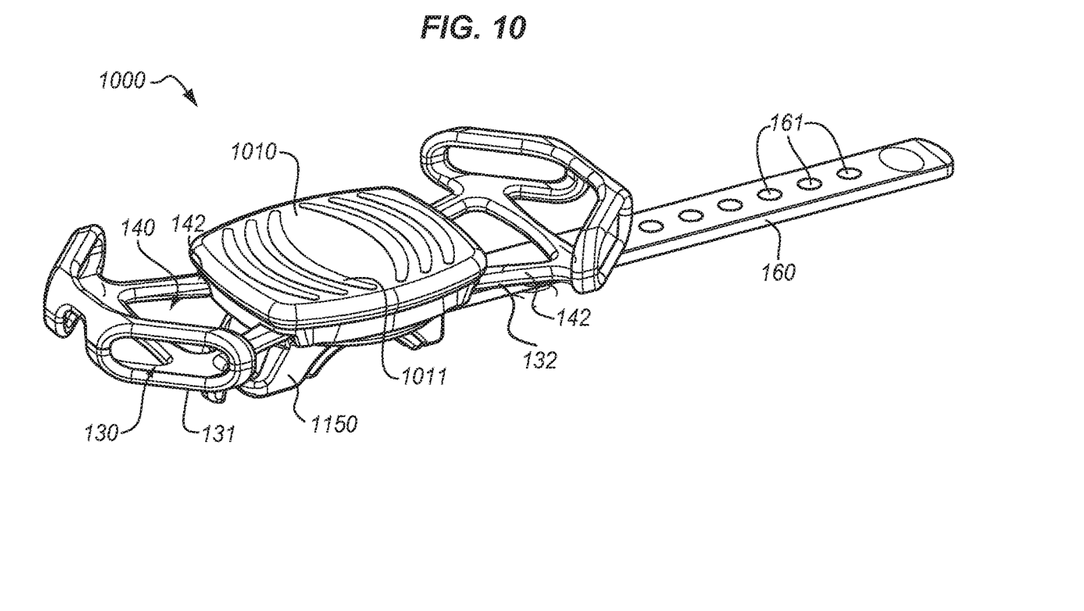
FIG. 10 shows one embodiment of a mountable multi-positional device holder.
Figure 11:
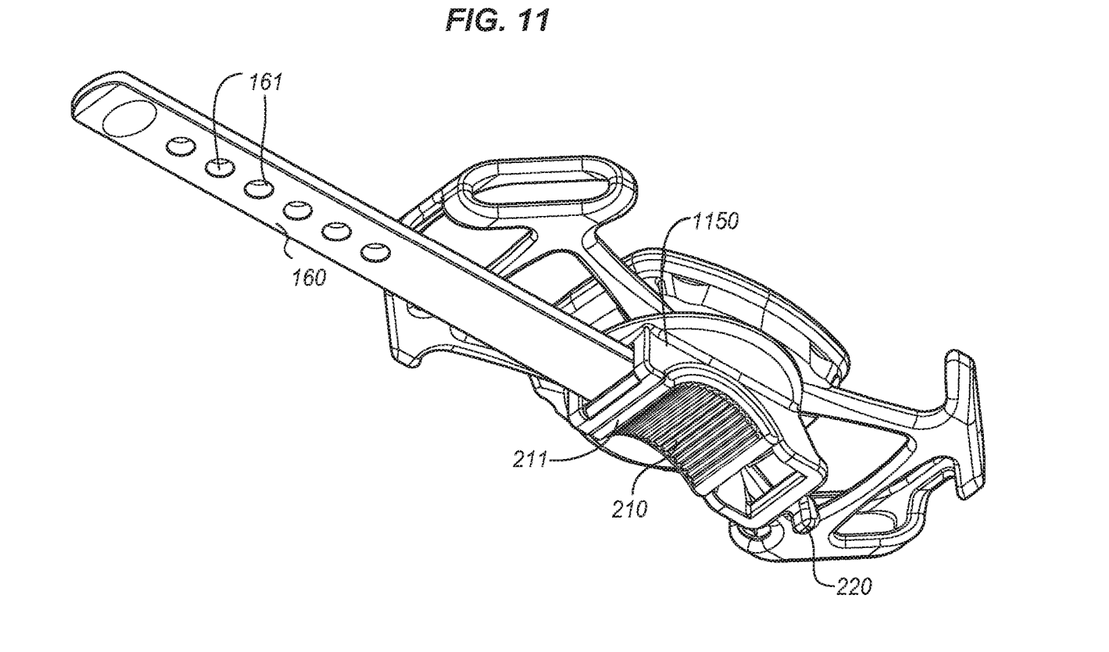
FIG. 11 shows a view of the underside of the mountable multi-positional device holder of FIG. 10.
Figure 12:
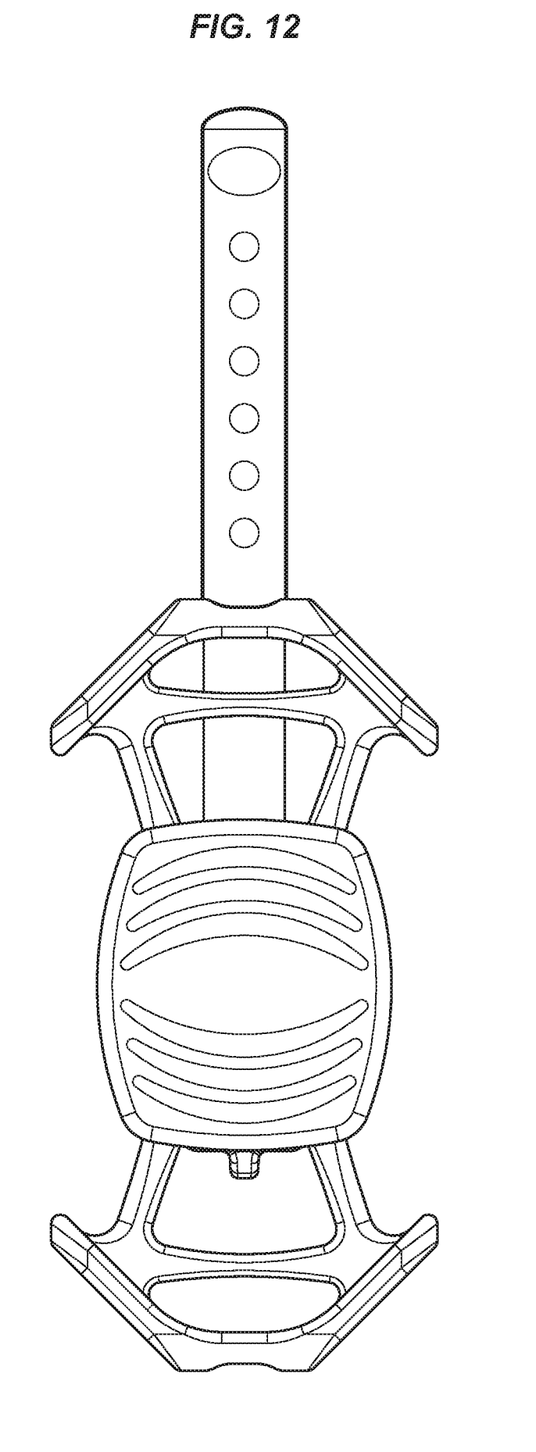
FIG. 12 shows a top view of the mountable multi-positional device holder of FIG. 10.
Figure 13:
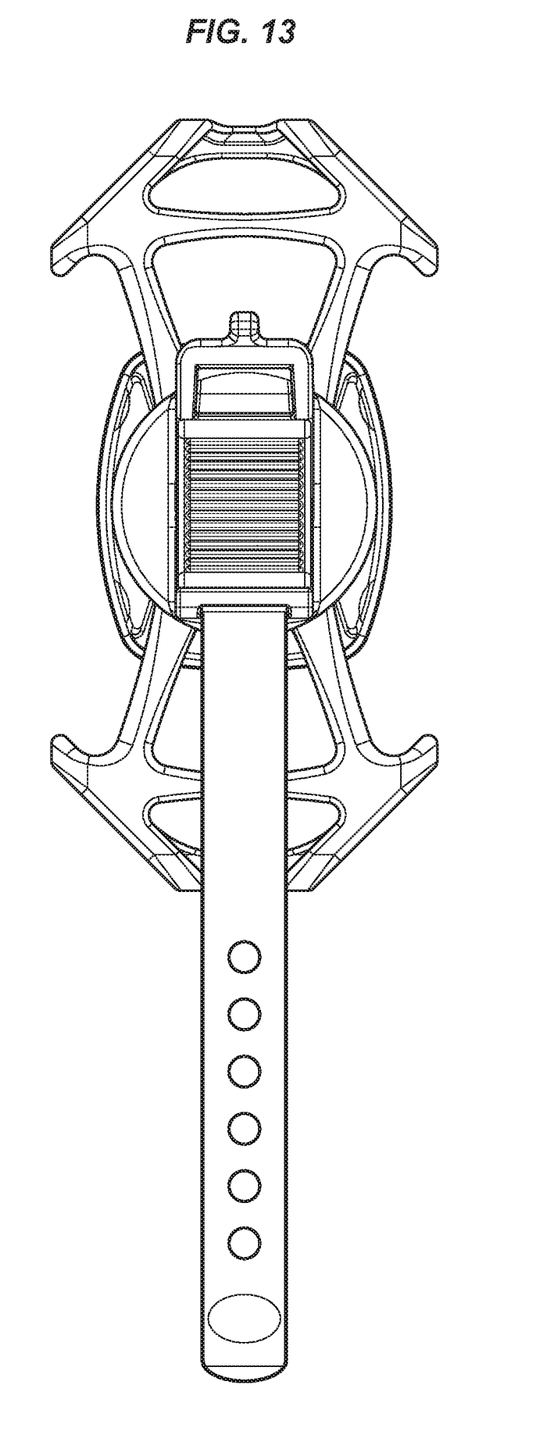
FIG. 13 shows a bottom view of the mountable multi-positional device holder of FIG. 10.
Figure 14:
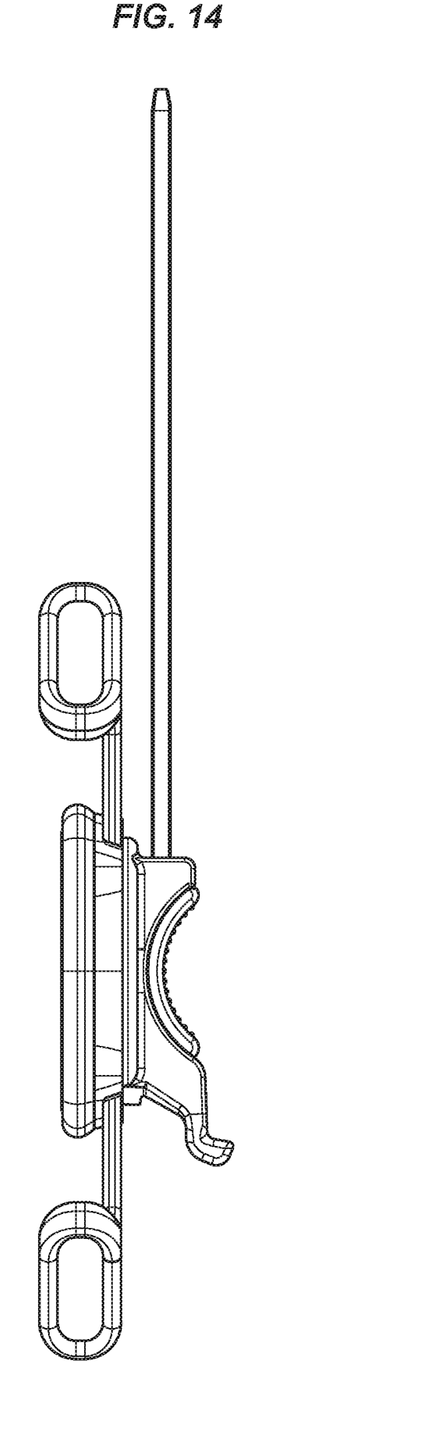
FIG. 14 shows a left side view of the mountable multi-positional device holder of FIG. 10.
Figure 15:
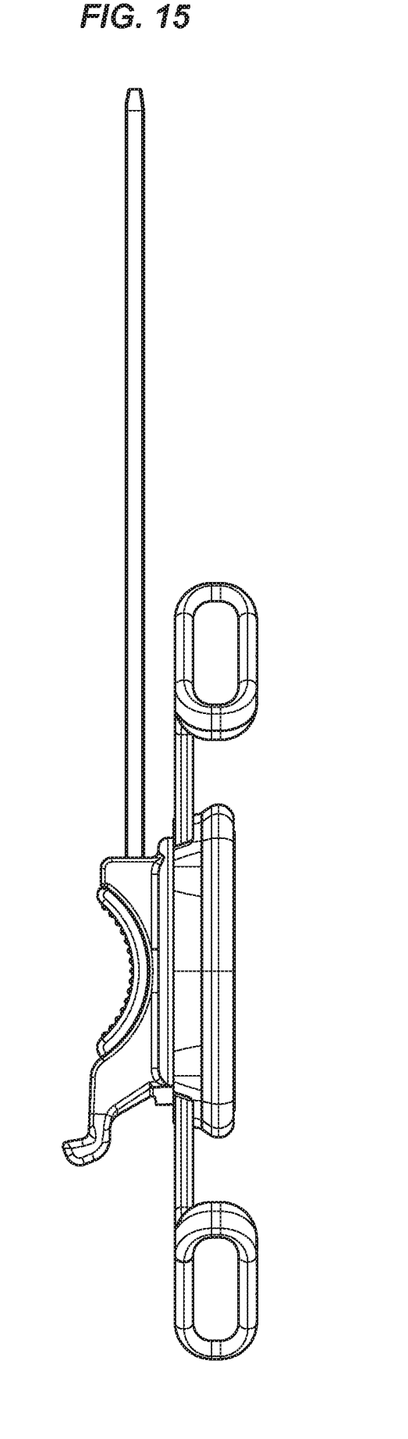
FIG. 15 shows a right side view of the mountable multi-positional device holder of FIG. 10.
Figure 16:
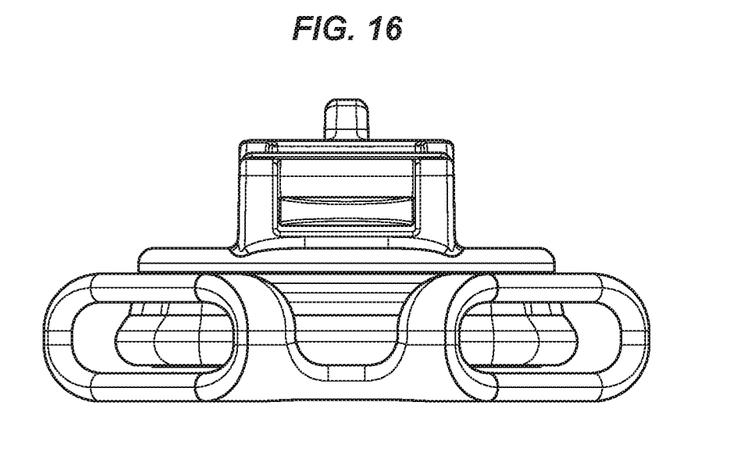
FIG. 16 shows a front view of the mountable multi-positional device holder of FIG. 10.
Figure 17:
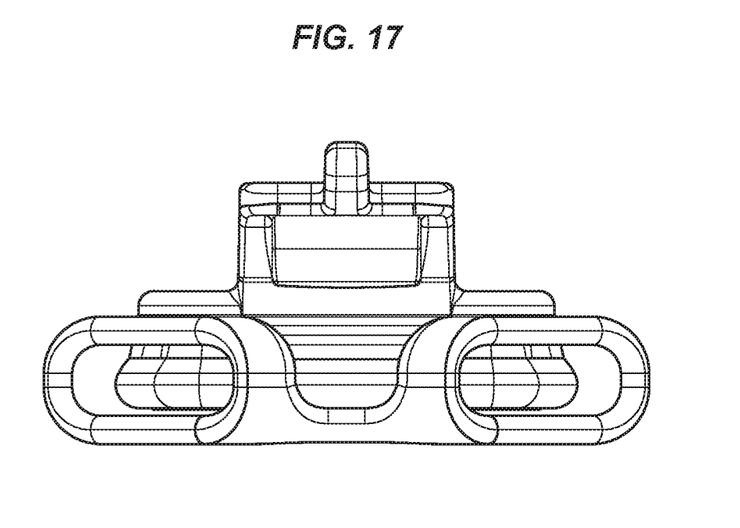
FIG. 17 shows a back view of the mountable multi-positional device holder of FIG. 10.

An alternative embodiment is shown in FIG. 10. This embodiment does not include the multi-positional system of device holder 100. Instead, this version includes a device plate 1010 with high friction material 1011 on the device plate 1010 attached to plate base 1840. Base portion 1150 allows for attachment to a variety of items and surfaces. Also visible is cage portion 132. Cage portion 132 is made of material that has such a durometer and elasticity such that it may stretch and bend to be placed around a mobile device and held firmly. The corners of the mobile device are placed through apertures 130 such that they are surrounded by band portions 131. Band portions 131 may stretch somewhat to tightly hold the device. Additionally, arms 142 and cutout 140 may accommodate the holding of the device by stretching as well. The dimensions and features of the cage portion 132 are purely exemplary and will vary based on the type of device the device holder 1000 is used with. Additionally, the point of the cage 132 is to provide a holder that can stretch and move with the device, while holding the device to the device holder 1010. FIG. 11 shows a view of the underside of the device holder 1000. Visible are base 1150 and connection area 210 and support 211. Prong 220 is designed to interface with apertures 161. Connection area 210 may include high friction material or features that increase the friction in connection area 210. In operation, the device holder 1000 may be placed on the handle bars of a bike or other item, contacting at connection area 210. Then the strap 160 may be wrapped around the handle bars and stretched tight to hold the device holder 1000 in place. The strap 160 is held by interfacing aperture 161 with prong 220, such that the strap is under tension. Note that is merely one preferred embodiment of an interconnection device.

Figure 18:
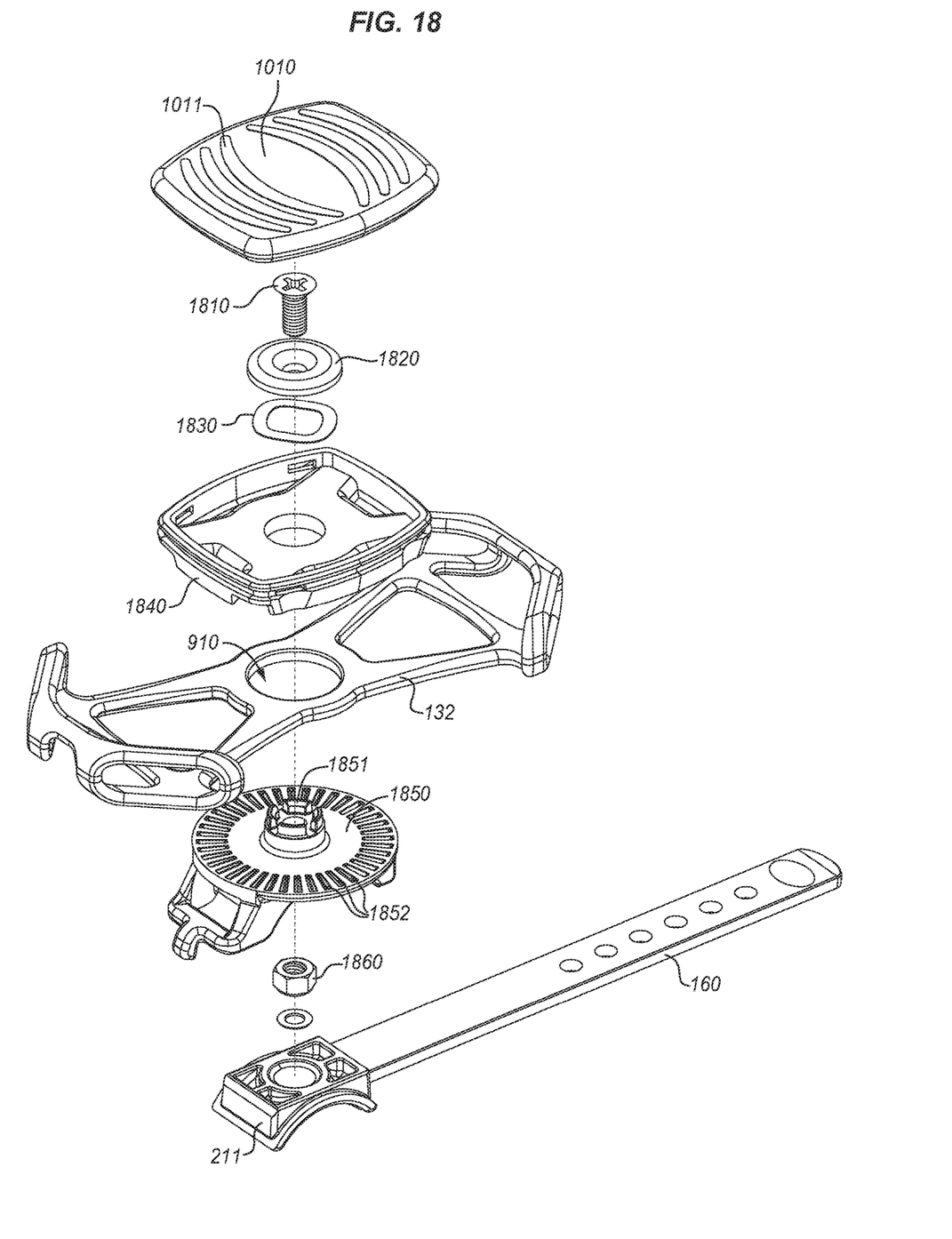
FIG. 18 shows an exploded view of the mountable multi-positional device holder of FIG. 10.

FIG. 18 shows an exploded of device holder 1000. Here it can be seen how the device 1000 fits together and the rotating nature of the cage 132 and device plate portion 1010. As shown the device plate portion 1010 includes a plate base 1840. This plate base 1840 is interconnected with base portion 1850 in a rotatable fashion via screw 1810, boss cap 1820, spring 1830, and nut 1860. This allows plate base 1840 to rotate in relation to base portion 1850. The top portion of base portion 1850 is designed to interface with boss cap 1820 to allow for rotation. Additionally, base portion 1850 has various divots 1852 into which a protrusion in the base of the base portion 1840 may fit to allow for a ratcheting type turning motion in which the spring 1830 is compressed, releasing the protrusion from its divot 1852 and allowing for the turning of the device.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A device holder, the device holder comprising:
    a base portion attachable to an object and including a post;
    an engagement portion configured to engage a first portion of a mobile device;
    a fastener threaded to the post to attach the engagement portion to the post;
    a cage portion rotatable about the post and surrounding the post at least partially between the base portion and the engagement portion, the cage portion configured to engage a second portion of the mobile device to hold the mobile device against the engagement portion, the cage portion rotatable about the post to selectively hold the mobile device in one of a plurality of positions; and
    a cage holder interacting with the base portion to hold the cage portion to the base portion, the cage holder shaped to fit at least partially around the cage portion to hold the cage portion in place.

2. The device holder of claim 1, wherein the cage portion is made of elastic material such that it stretches around the mobile device holding it firmly.

3. The device holder of claim 1, wherein the cage holder comprises a locking tab, the locking tab interacting with the base portion to hold the cage portion to the base portion, the locking tab fitting over the cage portion to hold the cage portion in place.

4. The device holder of claim 3, wherein the locking tab has a first position and a second position, the first position characterized by the locking tab being proximate to the base portion such that the cage portion is held to the base portion, the second position characterized by the locking tab being distal from the base portion, such that the cage portion can be removed.

5. A device holder, the device holder comprising:
    a base portion attachable to an object and including a post;
    an engagement portion attached to the post and configured to engage a first portion of a mobile device;
    a fastener threaded to the post to attach the engagement portion to the post;
    a cage portion shaped to hold the mobile device against the engagement portion, the cage portion surrounding the post between the base portion and the engagement portion and rotatable about the post to selectively hold the mobile device in one of a plurality of positions; and
    a cage holder interacting with the base portion to hold the cage portion to the base portion, the cage holder shaped to fit least partially around the cage portion to hold the cage portion in place.

6. The device holder of claim 5, wherein the engagement portion is rotatable in relation to the base portion.

7. The device holder of claim 6, wherein the cage portion is made of elastic material such that it stretches around the mobile device holding it firmly.

8. The device holder of claim 7, wherein the base portion includes a support, the support having a connection area.

9. The device holder of claim 8, wherein the base portion includes a prong and a strap including a plurality of apertures.

10. The device holder of claim 9, wherein the support and connection area are configured to accommodate an object placed in the connection area and the strap is positioned in relation to the object and the connection area such that the strap wraps around the object and is held in place by the prong passing through one of the plurality of apertures.

11. The device holder of claim 10, wherein the connection area has a concave shape and the object is a handle bar of a bike.

12. The device holder of claim 11, wherein the cage portion is shaped to surround a rectangular prism and includes a first, second, third, and fourth aperture, each of the first, second, third, and fourth apertures positioned to be diagonal to the sides of the rectangular prism, such that the first, second, third, and fourth aperture each allow a corner of the rectangular prism to pass through and thereby hold the rectangular prism.

13. A method of securing a device to a bicycle handle bars, the method comprising:
providing a device holder, the device holder comprising:
a base portion including a post,
an engagement portion configured to engage a first portion of the device,
a fastener threaded to the post to attach the engagement portion to the post,
a cage portion surrounding the post and positioned at least partially between the base portion and the engagement portion, the cage portion configured to engage a second portion of the mobile device to hold the device against the engagement portion, the cage portion rotatable about the post to selectively hold the device in one of a plurality of positions, and
a cage holder interacting with the base portion to hold the cage portion to the base portion, the cage holder shaped to fit at least partially around the cage portion to hold the cage portion in place;
stretching the cage portion around the device, such that the device is held by the cage portion and against the engagement portion;
connecting the base portion to the bicycle handle bars, by placing a connection area on the handle bars, stretching a strap around the handle bars, and locking the strap to the base portion using a prong of the base portion.

14. The device holder of claim 1, wherein the engagement portion is defined at least partially by a ball portion.

15. The device holder of claim 5, wherein the engagement portion is defined at least partially by a device plate comprising friction material configured to frictionally engage the mobile device.

16. The device holder of claim 1, wherein an interface between the base plate and the engagement portion selectively limits rotation of the engagement portion relative to the base portion.

17. The device holder of claim 1, wherein the engagement portion is interconnected with the base portion in a rotable fashion via the fastener and a spring.

18. The device holder of claim 14, further comprising a socket, the socket including a magnet, wherein the ball portion is made of magnetic material, and the magnet of the socket and the magnetic material of the ball portion cooperate to hold the socket in a position, and wherein the socket is interconnected with the mobile device.

19. The device holder of claim 18, wherein the base portion includes a support, the support having a connection area.

20. The device holder of claim 19, wherein the base portion includes a strap.

21. The device holder of claim 20, wherein the strap includes a plurality of apertures and the base portion includes a prong.

22. The device holder of claim 21, wherein the support and connection area are configured to accommodate an object placed in the connection area and the strap is positioned in relation to the object and the connection area such that the strap wraps around the object and is held in place by the prong passing through one of the plurality of apertures.

23. The device holder of claim 22, wherein the connection area has a concave shape and the object is a handle bar of a bike.

24. The device holder of claim 23, wherein the cage portion is shaped to surround a rectangular prism and includes a first, second, third, and fourth aperture, each of the first, second, third, and fourth apertures positioned to be diagonal to the sides of the rectangular prism, such that the first, second, third, and fourth aperture each allow a corner of the rectangular prism to pass through and thereby hold the rectangular prism.

25. The device holder of claim 17, wherein the base portion comprises a plurality of divots configured to releasably position the engagement portion in one of a plurality of positions, wherein the spring is compressible to allow for rotation of the engagement portion relative to the base portion.

* * * * *